United States Patent [19]

Anderson

[11] Patent Number: 5,197,622
[45] Date of Patent: Mar. 30, 1993

[54] VENT PRESSURE RELIEF DEVICE

[75] Inventor: John R. Anderson, Sandy Hook, Conn.

[73] Assignee: GTE Products Corporation, Stamford, Conn.

[21] Appl. No.: 931,223

[22] Filed: Aug. 17, 1992

[51] Int. Cl.⁵ .............................................. B65D 51/16
[52] U.S. Cl. ................................ 220/89.2; 137/68.1; 222/397
[58] Field of Search ................ 220/89.2; 137/68 R, 137/68.1; 222/397

[56] References Cited

U.S. PATENT DOCUMENTS

| 4,433,791 | 2/1984 | Mulanski | 220/89.2 |
| 4,513,874 | 4/1985 | Mulanski | 220/89.2 |
| 4,576,303 | 3/1986 | Mundt et al. | 220/89.2 |
| 4,580,690 | 4/1986 | Mulanski | 220/89.2 |
| 4,588,101 | 5/1986 | Ruegg | 220/89.2 |
| 4,610,370 | 9/1986 | Patterson et al. | 220/89.2 |
| 4,803,136 | 2/1989 | Bowsky et al. | 220/89.2 |

Primary Examiner—Joseph Man-Fu Moy
Attorney, Agent, or Firm—William H. McNeill

[57] ABSTRACT

A device for venting dangerous pressures within a cylindrical battery. Pressure relief is provided by special score lines in a container to give way under a pressure increase prior to the pressure rising to the level that might cause an explosive condition. To insure the score lines give before any other part, re-enforcig members are provided to re-enforce the other parts of the container.

3 Claims, 1 Drawing Sheet

VENT PRESSURE RELIEF DEVICE

TECHNICAL FIELD

This invention relates to cylindrical containers prone to increased pressure build-up under certain conditions.

BACKGROUND ART

Some forms of containers are subject to unwanted pressure increases. Batteries contain elements that may generate increased pressures under certain conditions. The conditions under which the pressure increase may arise can occur at any time during the life span of the article, or even after its usefulness is over. In some extreme conditions the pressure increase can even lead to an explosive release of pressure. Such an event is to be avoided.

Therefore, it is desireable to provide a venting means to relieve the unwanted pressure increase. The current methods used by most manufacturers involve the use of "vents" that open when the pressure inside the article reaches a pre-determined level. Most of the vents are essentially parts of the container and have a lower stress level than surrounding parts.

The areas of lower, or reduced stress level are created in a variety of ways. In Shillady, et al, U.S. Pat. No. 3,074,602, the area of reduced stress is accomplished by a place or spot having a reduced cross section on a point on the can that would deflect upon pressure build up. The deflection would cause the spot, with the reduced cross section, to rupture, creating a vent for the pressure contents. The problem with this pressure relief device is that the container must be at or near the explosive point before the device triggered. Often, by that point the vent by itself is not enough to prevent an explosion. This problem could not be solved by reducing the cross section even further, because this may result in premature venting.

More recently, the concept of a "reduced cross section" area being used as a vent has been further refined. In Zundel, U.S. Pat. No. 3,831,822, the pressure relief area is "defined by a pair of spaced weakened areas that are separated from each other by unweakened areas". Here the unweakened areas tend to give when explosive conditions arise. This creates tensile stress across the weakened areas, causing them to rupture, creating a vent for the increased pressure. The increased pressure could cause the unweakened areas to rupture very soon after the weakened areas, causing a force that may cause the article to become a projectile.

SUMMARY OF THE INVENTION

Therefore, it is an object of this invention to obviate the disadvantages of the prior art. It is also an object to create a pressure venting device that will insure venting through the proper channels. To assure the proper venting action, re-enforcing members are introduced to re-enforce the unweakened parts of the cylinder, assuring that venting action takes place through the weakened areas. Here the weakened areas are score lines.

The advantage of this device is a stronger article with higher, more controlled burst pressure and lower deflection.

These objects are accomplished, in one aspect of this invention, by the provision of a vent pressure relief device for a substantially cylindrical container. The pressure relief device comprises two arcuate concavities formed in one end of the container, the concavities extending upwardly into the interior of the container.

The device further comprises at least two diametrically opposed bridges formed in the one end of the container which interrupt at the two arcuate concavities.

The device further comprises two diametrically opposed score lines formed in the one end of the container, the score lines being formed to span the bridges and interconnect the arcuate concavities.

The improvement comprises at least two re-enforcing members formed in the one end, the re-enforcing members being formed in planes that intersect at their midpoints at the center of the one end.

Other advantages of the present invention will be readily appreciated as the same becomes better understood by reference to the following detailed description when considered in connection with the accompanying drawings.

BEST MODE FOR CARRYING OUT THE INVENTION

Figure 1:
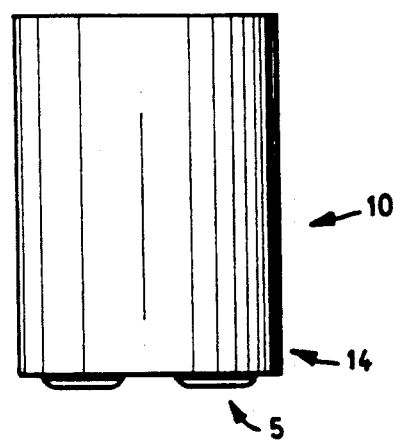
FIG. 1, is an elevational review of a cylindrical container having an embodiment of a vent pressure device described herein.

Referring now to the drawings, there is shown in FIG. 1, a vent pressure device 5 for a substantially cylindrical container 10, which can be, for example, an aerosol pressurized can or battery can.

Figure 2:
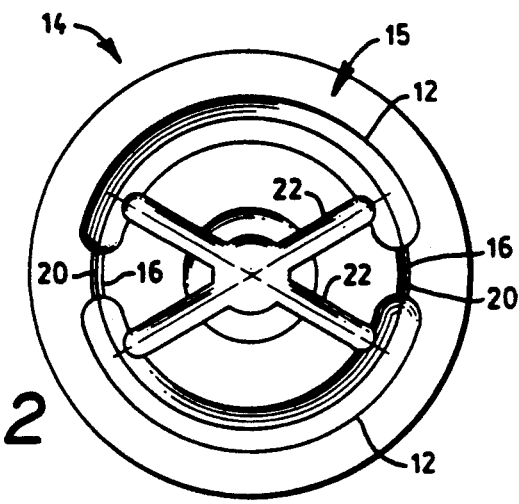
FIG. 2, is a plan view of an end of the container.
Figure 3:
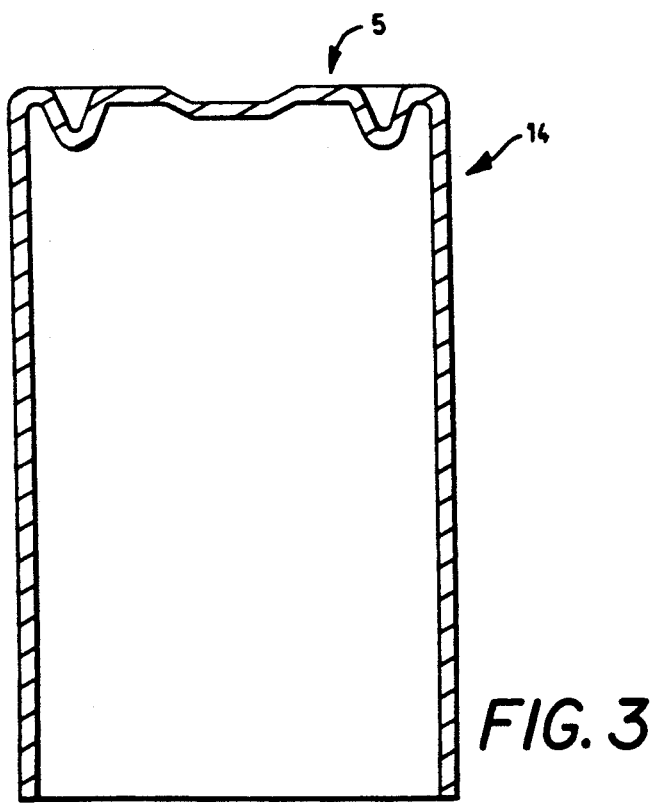
FIG. 3, is a cross section of the container.
Figure 4:
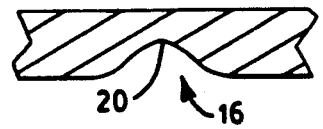
FIG. 4, is an enlarged sectional view of a scored area.

The vent pressure device 5, shown in FIG. 2, comprises at least two arcuate concavities 12,12 formed in one end 14 of the container 10. The arcuate concavities 12,12 are ribs that can extend into the container 10 or out of the container 10. The concavities 12,12 have an arcuate shape that is pressure resistant and yields deflection at an even rate.

On the ends of the concavities 12,12 are two bridges 16,16 that are diametrically opposed and formed in the one end 14 of the container 10. The bridges 16,16 lie in the same plane that forms the one end 14 and interrupts at the two arcuate concavities 12,12.

The vent pressure device 5 further comprises at least two diametrically opposed score lines 20 formed in the one end of the container, the score lines form to span the bridges 16 and interconnect the arcuate concavities 12,12. The score lines 20 constitute the weakened areas that rupture at a predetermined pressure point.

When pressure inside the cylinder 10 begins to increase, the arcuate concavities 12,12 begin to deflect at a given rate. This deflection creates tensile stress in the weakened areas which causes them to rupture. The rupture allows the contents of the container to exit in a controlled manner that will prevent an explosion.

At least two re-enforcing members 22, 22 are formed in the one end 14. The re-enforcing members 22, 22 are best utilized when formed as arcuate concavities. The members 22, 22 re-enforce the existing structure to prevent the one end from blowing out under explosive conditions.

Because the container 10 is re-enforced by the re-enforcing members, it can be built sturdier than other containers, having higher burst pressures and lower deflection during times of high pressure. While there have been shown and described what are at present considered to be the preferred embodiment of the invention, it will be apparent to those skilled in the art that various changes and modifications can be made herein without departing from the scope of the invention as defined by the appended claims.

I claim:

1. In a vent pressure device for a substantially cylindrical container having at least one closed end, said device comprising:

at least two arcuate concavities formed in said one closed end of said container, said concavities extending upwardly into the interior of the container;

at least two diametrically opposed bridges formed in said one closed end of said container which interrupt said at least two arcuate concavities; and at least two diametrically opposed score lines, said score lines formed to span said bridges and interconnect said arcuate concavities, the improvement comprising:

at least two re-enforcing members formed in the said one closed end, said re-enforcing members being formed in planes that intersect at their mid-points at the center of said one closed end.

2. The device as claimed in claim 1 wherein said re-enforcing members have a radius of 0.030 inches.

3. The device as claimed in claim 2 wherein said one closed end is nickle plated steel.

* * * * *